US011958594B2

(12) United States Patent
Czech (10) Patent No.: US 11,958,594 B2
(45) Date of Patent: Apr. 16, 2024

(54) CYCLIC PITCH ANGLE ADJUSTMENT APPARATUS

(71) Applicant: AIRBUS HELICOPTERS DEUTSCHLAND GMBH, Donauworth (DE)

(72) Inventor: Ian-Luca Czech, Sachsenheim (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 71 days.

(21) Appl. No.: 17/576,758

(22) Filed: Jan. 14, 2022

(65) Prior Publication Data

US 2022/0355921 A1    Nov. 10, 2022

(30) Foreign Application Priority Data

May 5, 2021    (EP) .................................... 21400009

(51) Int. Cl.
| | | |
|---|---|---|
| *B64C 27/54* | (2006.01) | |
| *B64C 27/04* | (2006.01) | |
| *B64C 27/59* | (2006.01) | |
| *B64C 27/605* | (2006.01) | |
| *B64C 27/625* | (2006.01) | |
| *B64C 27/72* | (2006.01) | |

(52) U.S. Cl.
CPC ............ *B64C 27/54* (2013.01); *B64C 27/605* (2013.01); *B64C 27/625* (2013.01); *B64C 27/72* (2013.01); *B64C 27/04* (2013.01); *B64C 27/59* (2013.01)

(58) Field of Classification Search
CPC ..... B64C 27/54; B64C 27/605; B64C 27/625; B64C 27/72; B64C 27/04; B64C 27/59
See application file for complete search history.

(56) References Cited

U.S. PATENT DOCUMENTS

| | | |
|---|---|---|
| 2,663,374 A | 12/1953 | Will |
| 2,684,721 A | 7/1954 | David |
| 2,978,037 A | 4/1961 | Focke |

(Continued)

FOREIGN PATENT DOCUMENTS

| | | | |
|---|---|---|---|
| CN | 110259579 A | * | 9/2019 |
| DE | 102004053001 A1 | | 5/2006 |

(Continued)

OTHER PUBLICATIONS

English Machine Translation of CN110259579A translated via USPTO Fit Database on Sep. 18, 2023 (Year: 2019).*

(Continued)

*Primary Examiner* — Dominick L Plakkoottam
*Assistant Examiner* — Paul W Thiede
(74) *Attorney, Agent, or Firm* — BROOKS KUSHMAN P.C.

(57) ABSTRACT

A cyclic pitch angle adjustment apparatus for a rotor or propeller and to a rotorcraft with such a rotor. The cyclic pitch angle adjustment apparatus may include levers that rotate rotor blades around associated pitch axes rods that mechanically link the levers with a bearing such that the rods are movable relative to the central point, the bearing being attached to a central rod that is movable and adapted for adjusting the cyclic pitch angle of the rotor blades from one pitch angle in one position to another pitch angle in another position.

19 Claims, 9 Drawing Sheets

(56) References Cited

U.S. PATENT DOCUMENTS

| | | | |
|---|---|---|---|
| 3,132,696 A | 5/1964 | Theodor | |
| 3,228,629 A | 1/1966 | Garner | |
| 3,508,841 A | 4/1970 | Derschmidt | |
| 3,556,674 A | 1/1971 | Foote | |
| 3,756,743 A | 9/1973 | Robertson | |
| 10,723,450 B2 * | 7/2020 | Schmiedel | B64C 27/59 |
| 2016/0236773 A1 * | 8/2016 | Jolly | B64C 27/001 |

FOREIGN PATENT DOCUMENTS

| | | |
|---|---|---|
| DE | 102005007129 A1 | 8/2006 |
| EP | 1985536 A2 | 10/2008 |
| EP | 3533710 B1 | 1/2021 |
| GB | 576876 A | 4/1946 |
| GB | 612688 A | 11/1948 |
| GB | 662319 A | 12/1951 |
| GB | 807423 A | 1/1959 |

OTHER PUBLICATIONS

European Search Report for European Application No. EP 21400009.3 Completed by the European Patent Office, dated Oct. 15, 2021, 10 pages.

* cited by examiner

CYCLIC PITCH ANGLE ADJUSTMENT APPARATUS

CROSS-REFERENCE TO RELATED APPLICATIONS

This application claims priority to European patent application No. EP 21400009.3 filed on May 5, 2021, the disclosure of which is incorporated in its entirety by reference herein.

TECHNICAL FIELD

The present embodiments relate to rotors and propellers, and, more particularly, to a cyclic pitch angle adjustment apparatus for controlling the cyclic pitch angle of the rotor blades of a rotor or propeller. Furthermore, the present embodiments relate to a rotor with such a cyclic pitch angle adjustment apparatus and to a rotorcraft with such a rotor.

BACKGROUND

Rotors are usually provided for producing thrust in a predetermined direction during operation. The thrust produced by the rotor blades of a rotor can be controlled in two different ways: either by controlling the rotation speed of the rotor blades around the rotor axis, or by controlling an aerodynamic lift coefficient of the rotor blades. The aerodynamic lift coefficient is usually controlled by adjusting an underlying pitch angle of the rotor blades.

Pitch angle adjustment is also desirable to compensate for asymmetries in air velocity, for example during operation in non-axial inflow fields i.e., when the air flow has a component that is perpendicular to the rotor plane and at the same time a component that is lateral to the rotor plane. In non-axial inflow fields, some rotor blades are rotating against the lateral air flow while others are rotating with the lateral air flow, which leads to unbalanced lift at the different rotor blades, depending on their current position. Unbalanced lift often leads to vibratory stresses on the rotor blades. Controlling the pitch angle of each rotor blade separately according to its rotation position, which is sometimes also referred to as "cyclic pitch control" or "cyclic pitch actuation", may lead to an evenly distributed lift on all rotor blades.

Controlling the pitch angle of rotor blades requires the active or passive control of flexible joints in rotor assemblies. In actively controlled rotor assemblies, each associated rotor blade is articulated and controlled individually over its azimuth angle of rotation, which often requires complex, heavy, and cost intensive pitch adjustment devices that require active control means with external energy supplies to adjust the pitch angle of each rotor blade individually.

Actively controlled rotor assemblies are usually not only provided with cyclic, but also with collective pitch adjustment devices in order to be effective regarding lift and drag. Examples for actively controlled rotor assemblies with pitch adjustment devices are described in documents U.S. Pat. No. 2,684,721, EP 1 985 536, DE 10 2005 007 129, DE 10 2004 053 001, U.S. Pat. No. 3,556,674, U.S. Pat. No. 3,228,629, GB 576 876, GB 612 688, GB 622 319, GB 807 423, and U.S. Pat. No. 3,508,841.

However, the cyclic and collective pitch adjustment devices are generally embodied with a comparatively great complexity and weight and require the implementation of cost-intensive, complex controlling mechanisms and surveillance means. More specifically, the cyclic and collective pitch adjustment devices usually comprise pitch control rods that are moved by a swashplate, or by an axially moveable ring around a respective rotor mast.

The document EP 3 533 710 B1 describes a rotor or propeller with rotor blades and a passive pitch angle adjustment apparatus. The passive pitch angle adjustment apparatus includes levers, rods, and a central rod. The levers are connected to the rotor blades and rotate them around a respective pitch axis. The rods are connected to the levers and mechanically link the levers with each other via a central point that is located outside the rotor plane. The central rod connects the central point with a base point that is located in a longitudinal direction of the rotor axis. The passive pitch angle adjustment apparatus enables a cyclic pitch adjustment of the rotor blades.

Document U.S. Pat. No. 2,978,037 describes a stabilizing system for adjusting simultaneously (a) collectively the pitch of the blades of a helicopter rotor, and (b) the cyclic pitch variation of the blade or several blades thereof. The stabilizing system comprises a simple arrangement of an inner and an outer annular member. The inner annular member can rotate around a fixed eccentric axis. The outer annular member is rotatably disposed about the inner annular member and connected by articulated linking members to the blades of a helicopter rotor for variation of the pitch of the latter. The rotor further comprises rod means for indicating the inclination of the blade cone and for automatically converting that inclination into a simultaneous interdependent adjustment of the collective pitch and the individual pitch variation of the rotor blades. In other words, the tilting of the whole blade cone is used as an input for balancing lift forces, and the stabilizing system is working in one flight direction only due to the fixed position of the eccentric axis. Therefore, the effects of sidewinds or a sideward flight cannot be recovered by this stabilizing system.

Document U.S. Pat. No. 3,756,743 A describes a hub for a rigid rotor of a rotary winged aircraft that includes means for varying the blade angle of attack of each blade of a rotor as each blade rotates around the path traced out by the rotor to bring about a non-sinusoidal cyclic pitch change whilst independently allowing a sinusoidal cyclic pitch control to be superimposed thereon through the medium of a spider, the means being associated with each of the blade roots and includes a spindle for each blade, the spindles being equidistantly mounted for rotational movement in a rotatable component of the hub, and at their inner ends are each in spiral-splined engagement with a plunger whose inner end bears on a fixed cam and whose outer periphery has a predetermined peripheral profile to enable, for each blade, the blade angle of attack in relation to its azimuth position to be varied to suit the speed of the rotary winged aircraft.

Document U.S. Pat. No. 3,132,696 A describes a collective and cyclic pitch control arrangement for jet-driven wings of a rotary wing aircraft that comprises rotor hub means rotatable with the wings of the aircraft, conduit means formed in said hub means for conducting operating gas to said wings, a stationary member including means rotatably supporting said hub means, said stationary member including a hollow cylinder means, a hollow piston means axially movable in said cylinder means, means operatively connected to said wings and to said piston means for increasing the wing angle upon movement of said piston means in one direction, restoring means operatively connected to said wings for decreasing the wing angle and moving said piston means in the opposite direction, conduit means formed in said stationary member and communicating with said conduit means in said hub means for conducting operating gas thereto.

Document U.S. Pat. No. 2,663,374 A describes an aircraft that comprises a body, a driven member mounted upon said body for rotation about a generally vertical axis, a lifting rotor having blades pivotally mounted upon said member for blade pitch adjustment about a transverse axis, said rotor also being pivotally mounted upon said member for tilting adjustment about the inter section of said vertical and transverse axes, control means including a ball-and-socket assembly supported from said body, and operating mechanism cooperatively, connecting said assembly with said rotor for adjusting said rotor blades about said transverse axis for collective pitch control of said rotor blades and cyclic pitch control mechanism including vertically translatable push-pull means operatively connected to said control means for tilting adjustment of said assembly for the cyclic pitch control of the blades of said rotor.

Some of the cited prior art documents describe passive pitch angle adjustment apparatuses. Others need complex arrangements of actuators, which create extra costs including recurring costs for maintenance.

SUMMARY

Based on the limitations and drawbacks of the prior art, an objective is to provide a cyclic pitch angle adjustment apparatus for a rotor with a rotor head and rotor blades. The cyclic pitch angle adjustment apparatus should be relatively simple, lightweight, and have low purchase and maintenance costs. Furthermore, the cyclic pitch angle adjustment apparatus should provide an increased efficiency of the rotor system in case of lateral air flow with reduced bending moments and vibration on the rotor head and rotor axis due to balanced lift forces.

These objectives are solved by a cyclic pitch angle adjustment apparatus.

More specifically, a cyclic pitch angle adjustment apparatus for a rotor with a rotor head and rotor blades that rotate around a rotor axis in a rotor plane comprises a base point, a bearing that is located in a central point outside the rotor plane, a first lever that is connected to a first rotor blade of the rotor blades and rotates the first rotor blade around a first pitch axis, a second lever that is connected to a second rotor blade of the rotor blades and rotates the second rotor blade around a second pitch axis, first and second rods that mechanically link the first and second levers with the bearing in the central point such that the first and second rods are movable relative to the central point, wherein first and second rods are integrally formed as a single rod, a connection that connects the first lever, the second lever, and the single rod with each other in a first location, and a central rod that connects the bearing with the base point, wherein the central rod is movable from a first position in which the central rod forms a fixed angle with the rotor axis to a second position in which the central rod forms the same fixed angle with the rotor axis, wherein the first and second positions differ, and wherein the central rod is adapted for adjusting the cyclic pitch angle of the first and second rotor blades in the first position to a first pitch angle and in the second position to a second pitch angle that is different than the first pitch angle.

Illustratively, a rotor may include a rotor hub and a rotor head, whereby the rotor hub is adapted for rotating around the rotor head. The rotor blades may be rotatably mounted on the rotor hub to allow for a change in the angle of attack (i.e., a change in pitch angle) of the rotor blades. An eccentric bearing journal may be attached to the rotor head, preferably apart from the rotor axis.

A lever is preferably firmly connected to the rotor blades. A rod may connect the eccentric bearing journal with the lever. A balance weight may be necessary on the opposite side of the connection between the rod and the lever. Depending on the position of the rotor blade, the distance between the connection of the rod and the lever to the eccentric bearing journal changes, so that a deflection of the rotor blade results to compensate this offset. The rotor blades change the angle of attack cyclically over the circumference, whereby the advancing rotor blade has a small angle of attack, and the retreating rotor blade has a comparatively larger angle of attack.

The presented cyclic pitch arrangement apparatus requires a slight increase in the complexity of the rotor system, while at the same time significantly improving aerodynamic behavior.

The cyclical pitch angle adjustment improves the distribution of the induced airspeed and the generation of lift over the rotor blade surface. Due to the improved aerodynamics, the cruising speed of the associated rotorcraft can be increased. In addition to the advantage of increased cruising speed, there is also an increase in efficiency due to improved aerodynamics.

Furthermore, a more even generation of lift has a positive effect on the loads and service life of the rotorcraft. Load fluctuations that occur due to high speeds on the advancing rotor blade and lower flow velocities on the returning rotor blade can be reduced in this way.

With an adjustable eccentricity, an optimization for the two flight states hovering and cruising is possible.

According to one aspect, a first move of the central rod with the bearing relative to the rotor axis causes a second move of the first and second rods that causes first and second rotational moves of the first and second levers and thereby first and second rotations of the first and second rotor blades around the first and second pitch axes, respectively.

According to one aspect, the cyclic pitch angle adjustment apparatus further comprises a balance weight that is arranged in a second location, wherein the first and second locations are on opposite sides of the rotor axis.

According to one aspect, the bearing has a first distance from the rotor axis in the first position and a second distance from the rotor axis in the second position, wherein the first and second distances from the rotor axis differ.

According to one aspect, the bearing has a first distance from the rotor plane in the first position and a second distance from the rotor plane in the second position, wherein the first and second distances from the rotor plane differ.

According to one aspect, the cyclic pitch angle adjustment apparatus further comprises a motor that is coupled to the central rod and adapted for moving the central rod from the first position to the second position.

According to one aspect, the cyclic pitch angle adjustment apparatus further comprises an adjustment device that is coupled between the motor and the central rod and that is adapted for adjusting at least one of a distance of the bearing from the rotor axis or a distance of the bearing from the rotor plane.

According to one aspect, the adjustment device further comprises a guiding groove that encompasses the central rod and guides the central rod from the first position to the second position.

According to one aspect, the adjustment device further comprises a control lever that is connected to the motor, wherein the motor moves the control lever such that the control lever moves the central rod in the guiding groove from the first position to the second position.

According to one aspect, the central rod is located inside the rotor head.

Moreover, a rotor may include the cyclic pitch angle adjustment apparatus as described above and rotor blades that rotate around a rotor axis in a rotor plane.

Furthermore, a rotorcraft may have the rotor as described above.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION

Exemplary embodiments may be included with any rotor or propeller having at least two rotor blades. For example, embodiments may be included in a rotor or a propeller of a transportation vehicle, if desired.

Figure 1:
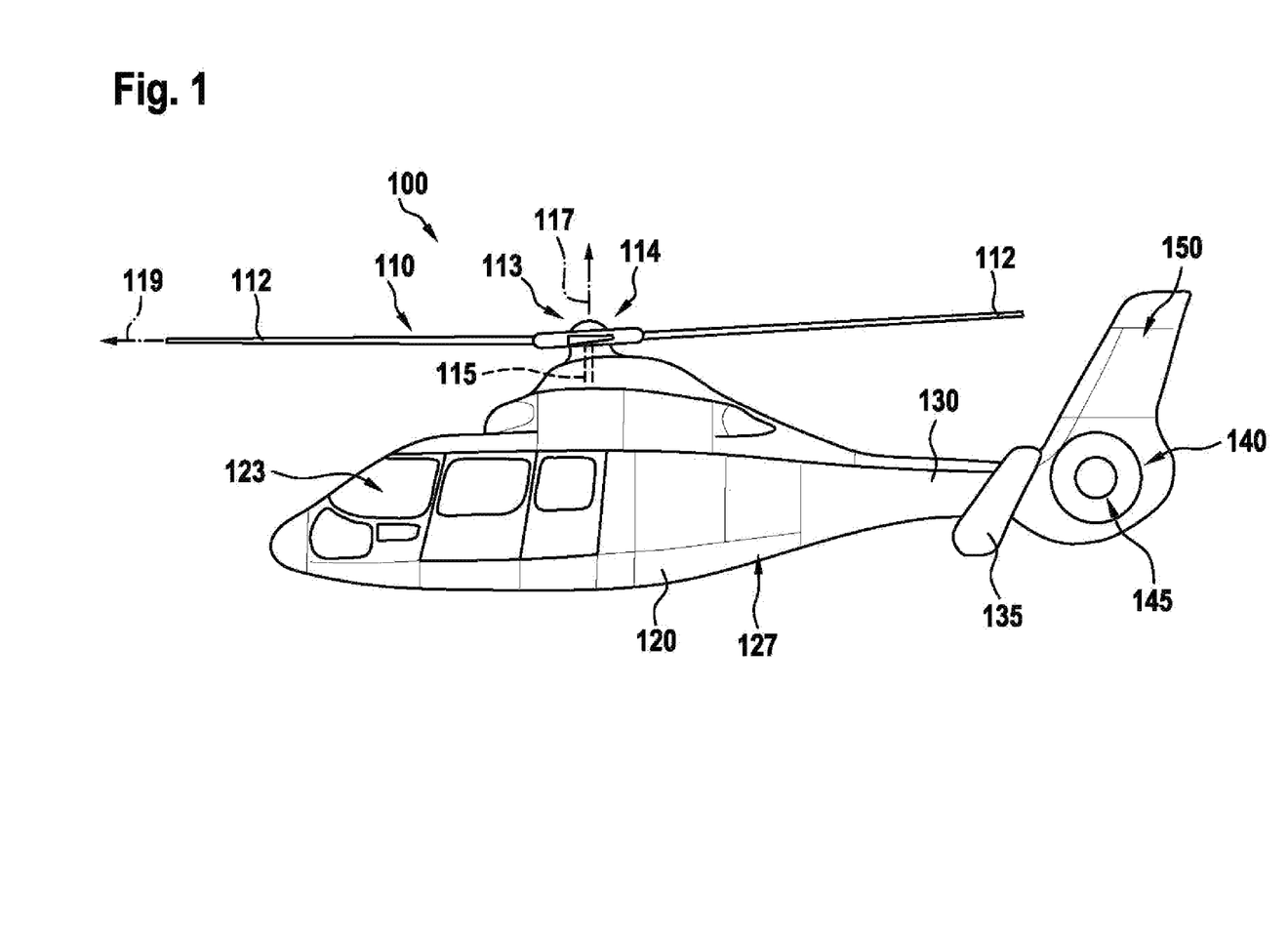
FIG. 1 is a diagram of an illustrative rotorcraft in accordance with some embodiments.

FIG. 1 shows an example of a transportation vehicle. A transportation vehicle may be an airplane, a quadcopter, a helicopter, or any other rotary wing transportation vehicle. As shown in FIG. 1, the transportation vehicle may be a rotorcraft 100 that is exemplarily illustrated as a helicopter. Thus, for purposes of simplicity and clarity, the rotorcraft 100 is hereinafter referred to as the "helicopter" 100.

Illustratively, helicopter 100 has a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

Illustratively, helicopter 100 may have at least one multi-blade rotor 110 for providing lift and forward or backward thrust during operation. The at least one multi-blade rotor 110 comprises at least two rotor blades 112 that are mounted at an associated rotor head 114 with a rotor hub 113 to a rotor shaft 115, which rotates in operation of the helicopter 100 around an associated rotor axis 117 in a rotor plane 119.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw. If desired, counter-torque device 140 may be shrouded.

The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

If desired, the at least one multi-blade rotor 110 and/or the tail rotor 145 may include a cyclic pitch angle adjustment apparatus for adjusting the cyclic pitch angle of the respective rotor blades 112.

Figure 2A:
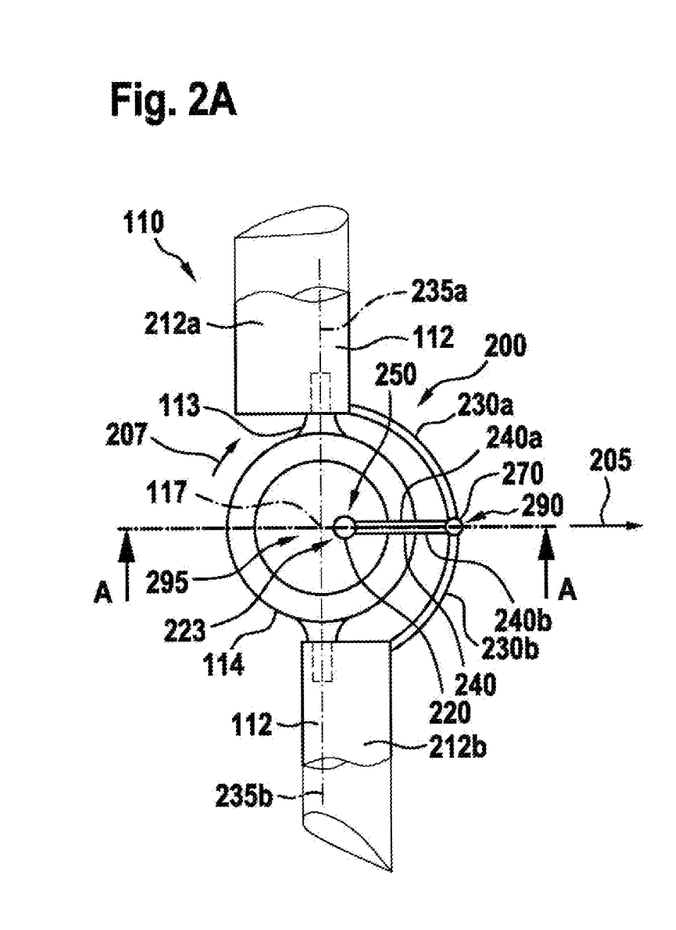
FIG. 2A is a diagram of an illustrative rotor with an illustrative cyclic pitch angle adjustment apparatus in accordance with some embodiments.
Figure 2B:
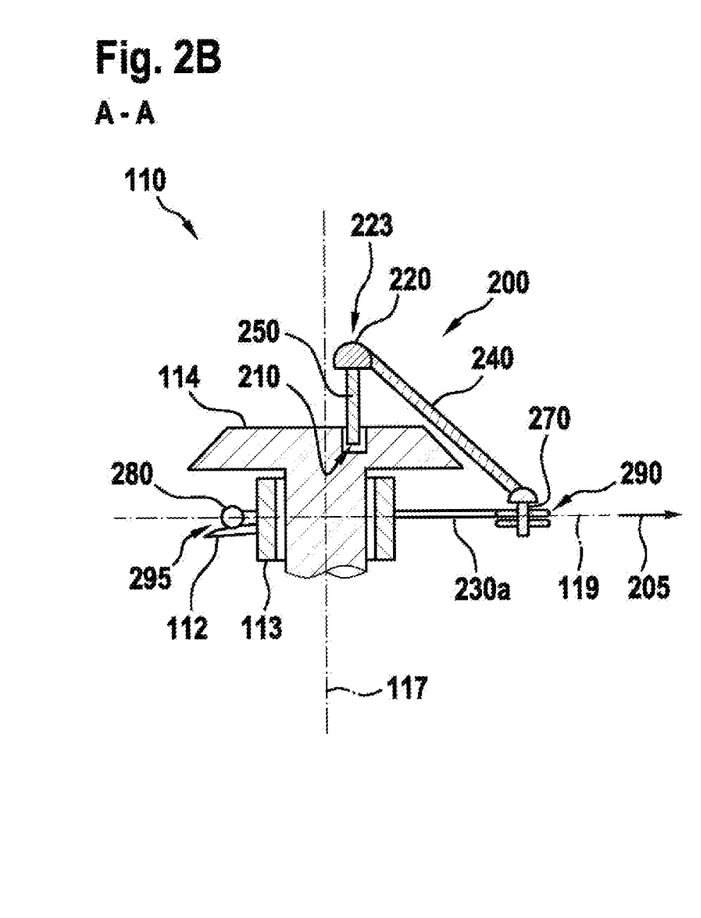
FIG. 2B is a cross-sectional view of the illustrative rotor with the illustrative cyclic pitch angle adjustment apparatus of FIG. 2A in accordance with some embodiments.

FIG. 2A shows an illustrative rotor 110 with an illustrative cyclic pitch angle adjustment apparatus 200, and FIG. 2B shows a cross-sectional view of the illustrative rotor 110 with the illustrative cyclic pitch angle adjustment apparatus 200 of FIG. 2A.

Illustratively, the rotor 110 may include rotor blades 112. The rotor blades 112 may rotate around a rotor axis 117 in a rotor plane 119. Illustratively, the rotor blades 112 may be mounted to a rotor hub 113 that rotates with the rotor blades 112 around a rotor head 114 and thereby around the rotor axis 117. Preferably, the rotor blades 112 are rotatably mounted to the rotor hub 113 to enable a pitch angle change through a rotation around a pitch axis 235a, 235b.

Cyclic pitch angle adjustment apparatus 200 may be adapted for adjusting the cyclic pitch angle of the rotor blades 112. As shown in FIG. 2B, the cyclic pitch angle adjustment apparatus 200 may include a base point 210 and a bearing 220 that is located in a central point 223 outside the rotor plane 119.

Illustratively, the cyclic pitch angle adjustment apparatus 200 may include a first lever 230a that is connected to a first rotor blade 212a of the rotor blades 112 and a second lever 230b that is connected to a second rotor blade 212b of the rotor blades 112. The first lever 230a may rotate the first rotor blade 212a around a first pitch axis 235a, and the second lever 230b may rotate the second rotor blade 212b around a second pitch axis 235b.

By way of example, the cyclic pitch angle adjustment apparatus 200 may include first and second rods 240a, 240b. The first and second rods 240a, 240b may mechanically link the first and second levers 230a, 230b with the bearing 220 in the central point 223 such that the first and second rods 240a, 240b are movable relative to the central point 223.

If desired, the first and second rods 240a, 240b of FIG. 2A may be integrally formed as a single rod 240. Optionally, the cyclic pitch angle adjustment apparatus 200 may include a connection 270. The connection 270 may connect the first lever 230a, the second lever 230b, and the single rod 240 with each other in a first location 290.

Illustratively, the cyclic pitch angle adjustment apparatus 200 may include a central rod 250 that connects the bearing 220 with the base point 210. The central rod 250 may be movable from a first position in which the central rod 250 forms a fixed angle with the rotor axis 117 to a second position in which the central rod 250 forms the same fixed angle with the rotor axis 117, whereby the first and second positions differ.

The fixed angle between the central rod 250 and the rotor axis 117 may be any angle. For example, the fixed angle may be 0°. In other words, the central rod 250 may be parallel to the rotor axis 117.

As an example, the bearing 220 may have a first distance from the rotor axis 117 in the first position and a second distance from the rotor axis 117 in the second position, wherein the first and second distances from the rotor axis 117 differ. As another example, the bearing 220 may have a first distance from the rotor plane 119 in the first position and a second distance from the rotor plane 119 in the second position, wherein the first and second distances from the rotor plane 119 differ.

If desired, bearing 220 may be implemented as a pivot bearing with only one degree of freedom, and the central rod 250 may be rotatably mounted at the base point 210.

Through a move of the central rod 250 from the first to the second position, the central rod 250 may be adapted for adjusting the cyclic pitch angle of the first and second rotor blades 212a, 212b in the first position to a first pitch angle and in the second position to a second pitch angle that is different than the first pitch angle.

For example, a first move of the central rod 250 with the bearing 220 relative to the rotor axis 117 causes a second move of the first and second rods 240a, 240b that causes first and second rotational moves of the first and second levers 230a, 230b and thereby first and second rotations of the first and second rotor blades 212a, 212b around the first and second pitch axes 235a, 235b, respectively.

Illustratively, the cyclic pitch angle adjustment apparatus 200 changes the angle of attack of the rotor blades 112 over the course of rotation around the rotor axis 117. Over the course of a rotation of the rotor blades 112 around the rotor axis 117, the rotor blades 112 that move forward in the relative airflow, (i.e., in the same direction as the rotorcraft) (e.g., rotor blade 212a of FIG. 2A) are sometimes also referred to as advancing rotor blades, and the rotor blades 112 that move backward in the relative airflow (i.e., in the opposite direction as the rotorcraft) (e.g., rotor blade 212b of FIG. 2A) are sometimes also referred to as retreating rotor blades.

For example, consider the scenario in which a rotorcraft with rotor 110 flies in flight direction 205 and that the rotor blades 112 rotate around rotor axis 117 in direction of rotation 207.

In this scenario, the cyclic pitch angle adjustment apparatus 200 may adjust the cyclic pitch angle of the first and second rotor blades 212a, 212b by reducing the angle of attack of the advancing rotor blade (i.e., the first rotor blade 212a in the position shown in FIG. 2A) and increasing the angle of attack of the retreating rotor blade (i.e., the second rotor blade 212b in the position shown in FIG. 2A). Illustratively, the cyclic pitch angle (i.e., the angle of attack) may be adjusted depending on the flight speed.

As an example, an increase in flight speed from a first flight speed to a second flight speed may result in a reduction of the angle of attack of the advancing rotor blade (i.e., the first rotor blade 212a in the position shown in FIG. 2A) from a first to a second angle of attack and an increase of the angle of attack of the retreating rotor blade (i.e., the second rotor blade 212b in the position shown in FIG. 2A) from a third to a fourth angle of attack.

As another example, a decrease in flight speed from the second flight speed to the first flight speed may result in an increase of the angle of attack of the advancing rotor blade 212a from the second to the first angle of attack and a decrease of the angle of attack of the retreating rotor blade 212b from the fourth to the third angle of attack.

By way of example, the cyclic pitch angle adjustment apparatus 200 may include a balance weight 280. The balance weight 280 may prevent imbalances during rotation of the rotor 110 around rotor axis 117. These imbalances could cause severe damage to the rotor 110.

The balance weight 280 may be arranged in a second location 295. The first and second locations 290, 295 rotate around the rotor axis 117 with the rotor blades 112. Preferably, the first and second locations 290, 295 are on opposite sides of the rotor axis 117.

Figure 3A:
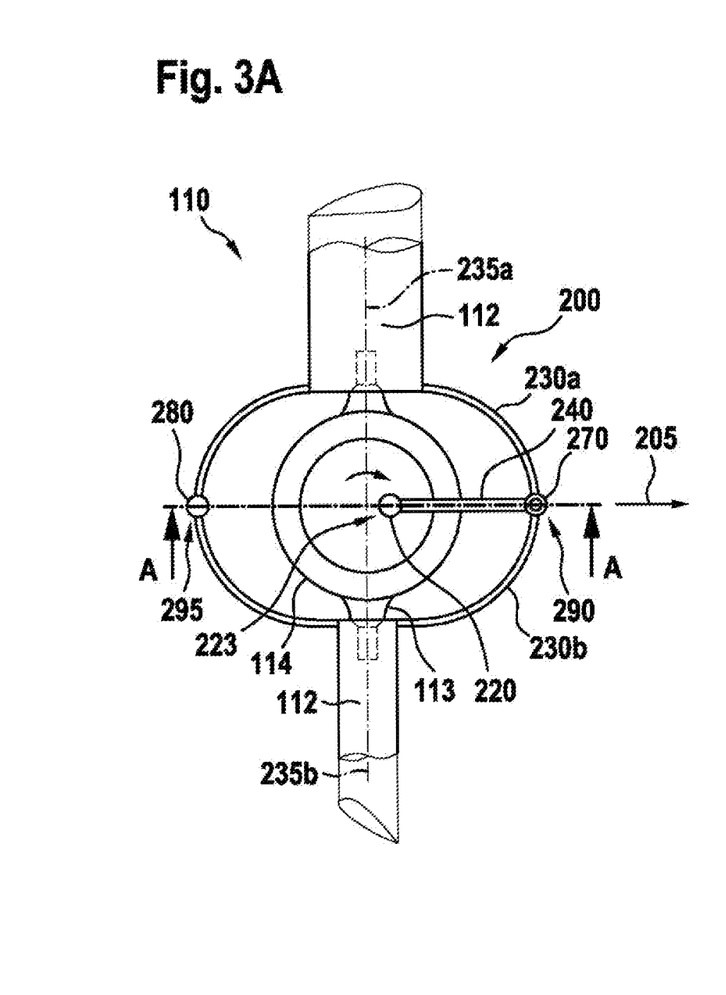
FIG. 3A is a diagram of an illustrative rotor with an illustrative cyclic pitch angle adjustment apparatus having levers that extend around the rotor hub in accordance with some embodiments.
Figure 3B:
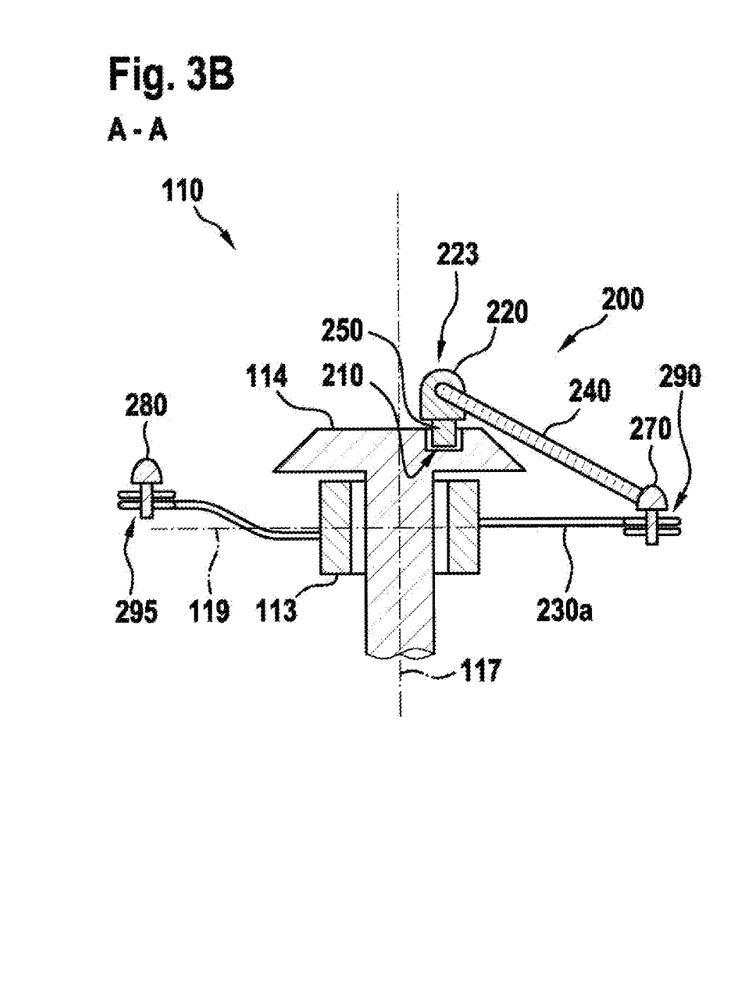
FIG. 3B is a cross-sectional view of the illustrative rotor with the illustrative cyclic pitch angle adjustment apparatus of FIG. 3A in accordance with some embodiments.

FIG. 3A is a diagram of an illustrative rotor 110 with an illustrative cyclic pitch angle adjustment apparatus 200 having levers 230a, 230b that extend around the rotor hub 113, and FIG. 3B is a cross-sectional view of the illustrative rotor 110 with the illustrative cyclic pitch angle adjustment apparatus 200 of FIG. 3A.

The cyclic pitch angle adjustment apparatus 200 of FIG. 3A and FIG. 3B differs from the cyclic pitch angle adjustment apparatus 200 of FIG. 2A and FIG. 2B in that the levers 230a, 230b are elongated and connect in the second location 295. Thus, the levers 230a, 230b are identical and therefore interchangeable, which reduces the number of different parts in rotor 110.

Moreover, the balance weight 280 may be arranged in the second location 295 in which the elongated levers 230a, 230b connect. As a result of the elongated and connected levers 230a, 230b and the position of the balance weight 280, the cyclic pitch angle adjustment apparatus 200 of FIG. 3A and FIG. 3B may have an improved centripetal force distribution compared to the cyclic pitch angle adjustment apparatus 200 of FIG. 2A and FIG. 2B.

Figure 4:
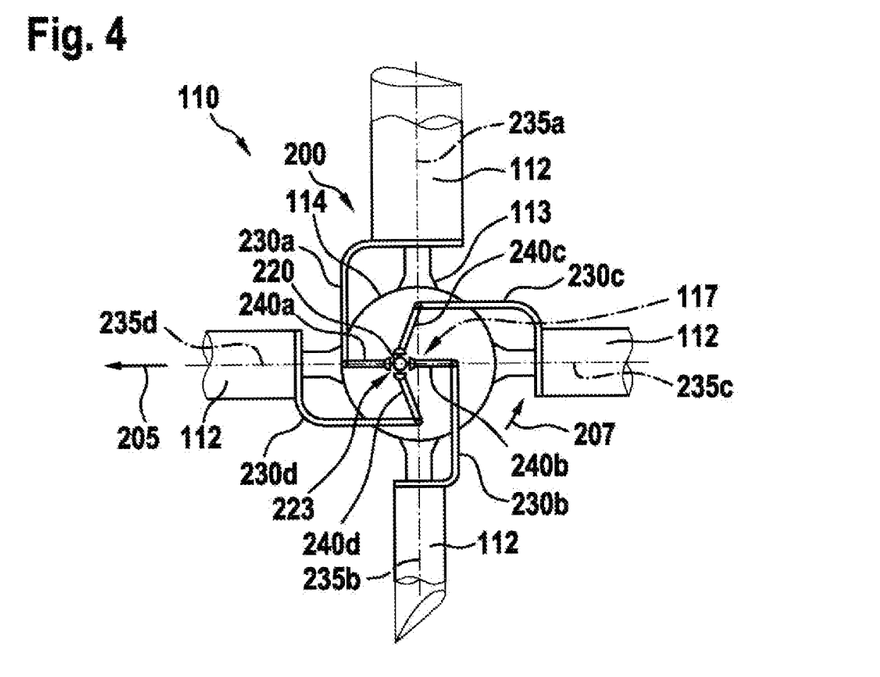
FIG. 4 is a diagram of an illustrative rotor having four rotor blades and an illustrative cyclic pitch angle adjustment apparatus in accordance with some embodiments.

FIG. 4 is a diagram of an illustrative rotor 110 having an illustrative cyclic pitch angle adjustment apparatus 200 and four rotor blades 112 that rotate around a rotor axis 117 in a rotor plane. The illustrative cyclic pitch angle adjustment apparatus 200 may include a bearing 220 that is located in a central point 223 outside the rotor plane.

By way of example, levers 230a, 230b, 230c, 230d may be connected to respective rotor blades 112 and rotate the respective rotor blades 112 around a respective pitch axis 235a, 235b, 235c, 235d.

Illustratively, rods 240a, 240b, 240c, 240d may mechanically link the respective levers 230a, 230b, 230c, 230d with the bearing 220 in the central point 223 such that the rods 240a, 240b, 240c, 240d are movable relative to the central point 223.

If desired, the cyclic pitch angle adjustment apparatus 200 may include a distribution element. The distribution element may establish a connection between the bearing 220 and the rods 240a, 240b, 240c, 240d.

As an example, the distribution element may include first, second, third, and fourth ball joints. The first, second, third, and fourth ball joints may connect the first, second, third, and fourth rods 240a, 240b, 240c, 240d with the bearing 220 in the central point 223, respectively. If desired, four additional ball joints may connect the first, second, third, and fourth rods 240a, 240b, 240c, 240d with the first, second, third, and fourth levers 230a, 230b, 230c, 230d, respectively.

By way of example, cyclic pitch adjustment apparatus 200 may include a central rod 250 that connects the bearing 220 with a base point. As an example, the base point may be located on the rotor head 114.

The central rod 250 may be movable from a first position in which the central rod 250 forms a fixed angle with the rotor axis 117 to a second position in which the central rod 250 forms the same fixed angle with the rotor axis 117.

Thereby, the central rod 250 may be adapted for adjusting the cyclic pitch angle of the rotor blades 112 in the first position to a first pitch angle and in the second position to a second pitch angle that is different than the first pitch angle.

For example, a first move of the central rod 250 with the bearing 220 relative to the rotor axis 117 may cause a second move of the rods 240a, 240b, 240c, 240d that cause rotational moves of the levers 230a, 230b, 230c, 230d and thereby rotations of the rotor blades 112 around the pitch axes 235a, 235b, 235c, 235d, respectively.

Illustratively, a motor and/or an adjustment device may move the central rod 250 with the bearing 220 from a first position to a second position. FIGS. 5 to 9B show illustrative cyclic pitch angle adjustment apparatuses with a motor and/or an adjustment device that are adapted for moving the central rod 250 with the bearing 220. For purposes of simplicity and clarity, some features have been omitted from the illustrative cyclic pitch angle adjustment apparatuses of FIGS. 5 to 9B. For example, rods 240 and levers 230 and the connections with the rotor blades 120 are not explicitly shown. However, the cyclic pitch angle adjustment apparatuses of FIGS. 5 to 9B may be integrated with any cyclic pitch angle adjustment apparatus 200 and any rotor 110 of FIGS. 2A to 4, if desired.

Figure 5:
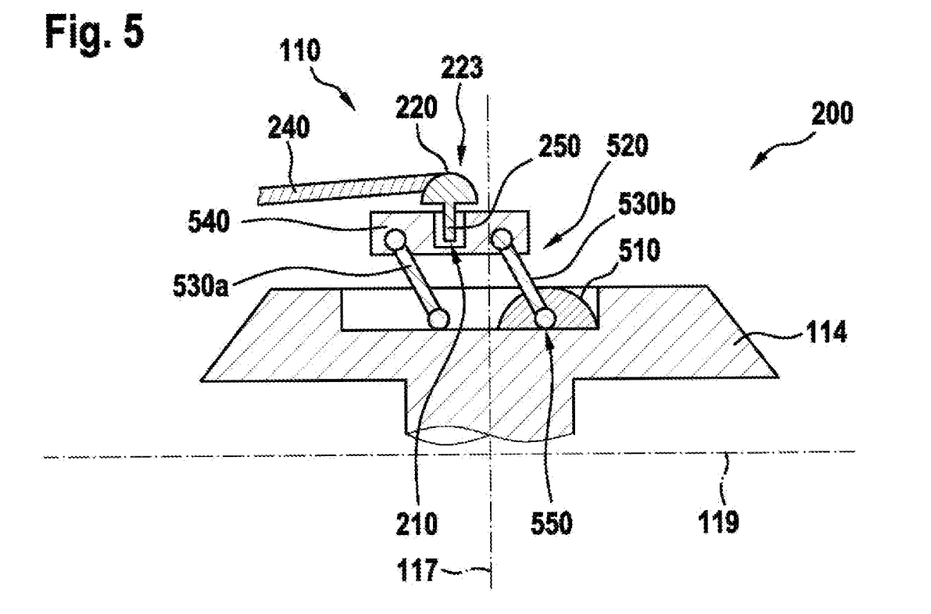
FIG. 5 is a diagram of an illustrative cyclic pitch angle adjustment apparatus with an adjustment device in accordance with some embodiments.

FIG. 5 is a diagram of an illustrative cyclic pitch angle adjustment apparatus 200 with a motor 510 and an illustrative adjustment device 520. As shown in FIG. 5, the motor 510 may be coupled to the central rod 250 and adapted for moving the central rod 250 from the first position to the second position. For example, the motor 510 may be coupled to the central rod 250 via the adjustment device 520.

The adjustment device 520 that is coupled between the motor 510 and the central rod 250 may be adapted for adjusting at least one of a distance of the bearing 220 from the rotor axis 117 or a distance of the bearing 220 from the rotor plane 119.

Illustratively, the motor 510 may be any actuator that is able to move the central rod 250 via the adjustment device 520 from the first position to the second position. For example, the motor 510 may be any rotary actuator or linear actuator that allows for precise control of angular or linear position. If desired, the motor 510 may be a servomotor. Such a servomotor may include an electric motor and a sensor for position feedback.

As an example, the bearing 220 may have a first distance from the rotor axis 117 in the first position and a second distance from the rotor axis 117 in the second position, whereby the first and second distances from the rotor axis 117 differ. As another example, the bearing 220 may have a first distance from the rotor plane 119 in the first position and a second distance from the rotor plane 119 in the second position, whereby the first and second distances from the rotor plane 119 differ.

Illustratively, the adjustment device 520 may include a platform 540. The base point 210 of the cyclic pitch angle adjustment apparatus 200 may be located on the platform 540. For example, the central rod 250 may be fixedly attached to the platform 540 at the base point 210.

By way of example, the adjustment device 520 may include legs 530a, 530b. Legs 530a, 530b may be rotatably attached to platform 540. Furthermore, leg 530a may be rotatably attached to rotor head 114, while leg 530b may be fixedly attached to motor 510.

Thus, as shown in FIG. 5, the adjustment device 520 may be adapted for adjusting both the distance of the bearing 220 from the rotor axis 117 and the distance of the bearing 220 from the rotor plane 119 simultaneously.

As an example, consider the scenario in which the motor 510 is a rotary actuator that rotates around axis 550. In this scenario, the motor 510 may move the platform 540 and thereby the bearing 220 such that the distance of the bearing 220 from the rotor axis 117 and the rotor plane 119 changes.

When the bearing 220 is located on the rotor axis 117 and furthest away from the rotor plane 119, the cyclic pitch adjustment apparatus 200 may adjust the pitch angle of all rotor blades to be the same. Thus, the rotor is optimized for hover flight.

When the bearing 220 is located furthest away from the rotor axis 117 and closest to the rotor plane 119, the cyclic pitch adjustment apparatus 200 may adjust the cyclic pitch angle of the advancing and retreating rotor blades to have the greatest pitch angle difference. Thus, the rotor is optimized for fast forward flight.

Figure 6A:
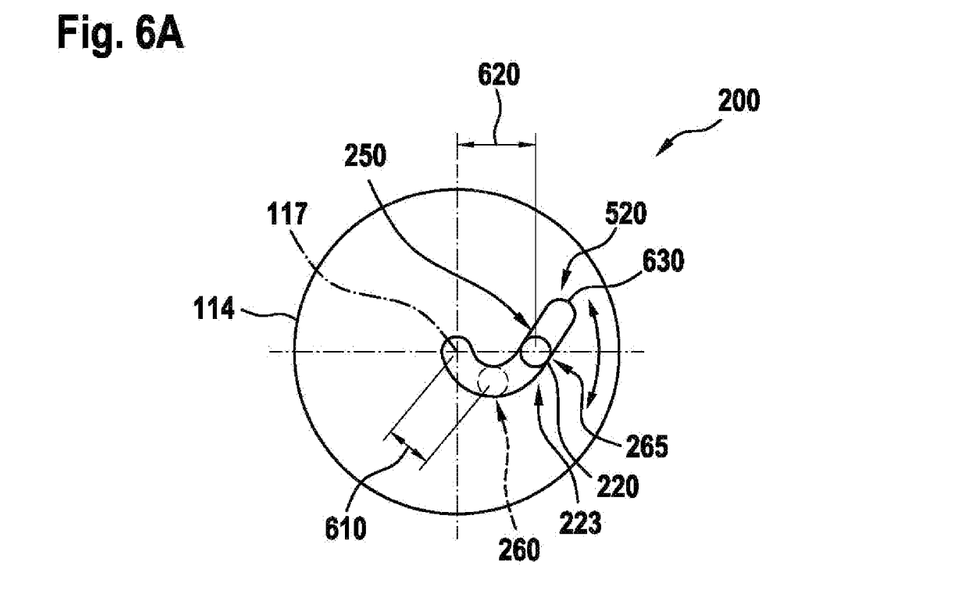
FIG. 6A is a diagram of an illustrative cyclic pitch angle adjustment apparatus with an adjustment device that includes a guiding groove in accordance with some embodiments.

FIG. 6A is a diagram of an illustrative cyclic pitch angle adjustment apparatus 200 with an adjustment device 520 that includes a guiding groove 630.

Illustratively, the cyclic pitch angle adjustment apparatus 200 includes a central rod 250. The central rod 250 may connect a base point with a bearing 220 that is located in a central point 223.

Preferably, the central rod 250 is movable from a first position 260 to a second position 265 that is different than the first position 260, thereby adjusting the cyclic pitch angle of rotor blades 112 from a first pitch angle in the first position 260 to a second pitch angle in the second position 265.

Illustratively, a guiding groove 630 may encompass the central rod 250. If desired, the guiding groove 630 may guide the central rod 250 from the first position 260 to the second position 265. For example, the guiding groove 630 may turn relative to the rotor axis 117, thereby changing the eccentricity of the bearing 220 (i.e., the distance from the rotor axis 117 from the first distance 610 to the second distance 620) by moving the central rod 250 from the first to the second position 260, 265.

Thus, as shown in FIG. 6A, the bearing 220 may have a first distance 610 from the rotor axis 117 in the first position 260 and a second distance 620 from the rotor axis 117 in the second position 265, whereby the first and second distances 610, 620 from the rotor axis 117 differ. If desired, the bearing 220 may have a first distance from the rotor plane 119 in the first position 260 and a second distance from the rotor plane 119 in the second position 265, whereby the first and second distances from the rotor plane 119 differ.

By way of example, the guiding groove 630 may be formed as part of the rotor head 114. For example, the guiding groove 630 may be a groove in the cover of the rotor head 114.

Figure 6B:
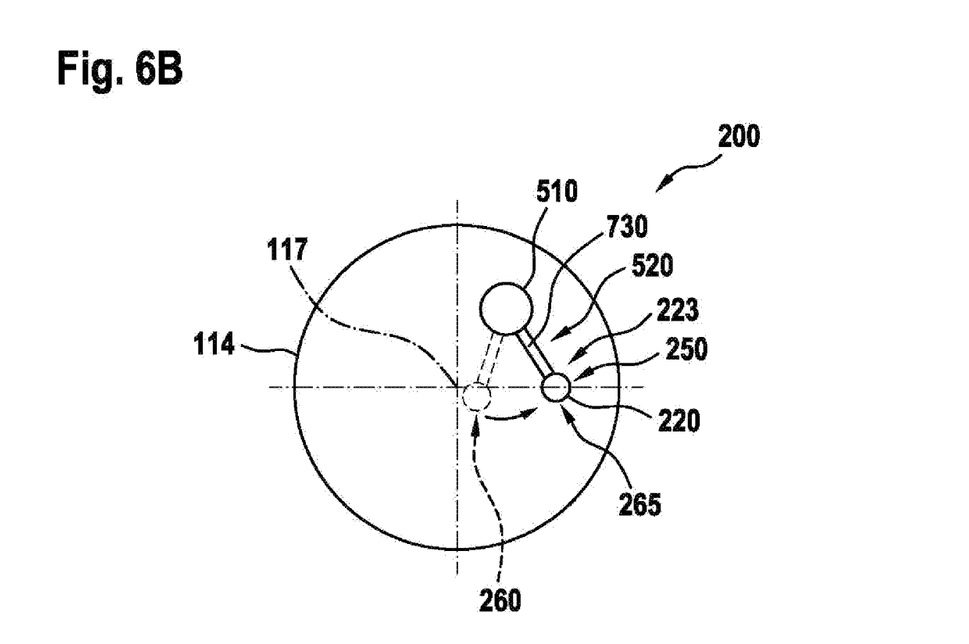
FIG. 6B is a diagram of an illustrative cyclic pitch angle adjustment apparatus with a motor and an adjustment device that includes a control lever in accordance with some embodiments.

FIG. 6B is a diagram of an illustrative cyclic pitch angle adjustment apparatus 200 with a motor 510 and an adjustment device 520 that includes a control lever 730. As shown in FIG. 6B, the motor 510 may be located on the rotor head 114 apart from the rotor axis 117. Illustratively, the motor 510 may rotate around an axis that is parallel to the rotor axis 117. If desired, the motor 510 may rotate around an axis that is inclined by an angle relative to the rotor axis 117.

The control lever 730 may be connected to the motor 510 such that a rotation of the motor 510 causes a rotation of the control lever 730. Illustratively, the control lever 730 may encompass the central rod 250. For example, the control lever 730 may have a fork shape that encompasses the central rod 250 such that a rotation of the control lever 730 moves the central rod 250.

If desired, the central rod 250 may move in a guiding groove 630. For example, the motor 510 may move the control lever 730 such that the control lever 730 moves the central rod 250 in the guiding groove 630 from the first position 260 to the second position 265.

Figure 7A:
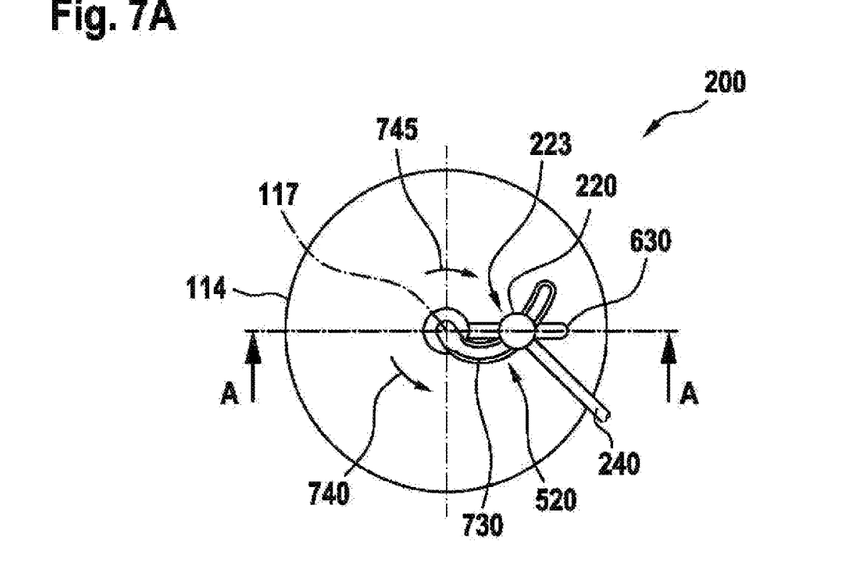
FIG. 7A is a diagram of an illustrative cyclic pitch angle adjustment apparatus with a motor and an adjustment device that includes a guiding groove and a control lever in accordance with some embodiments.
Figure 7B:
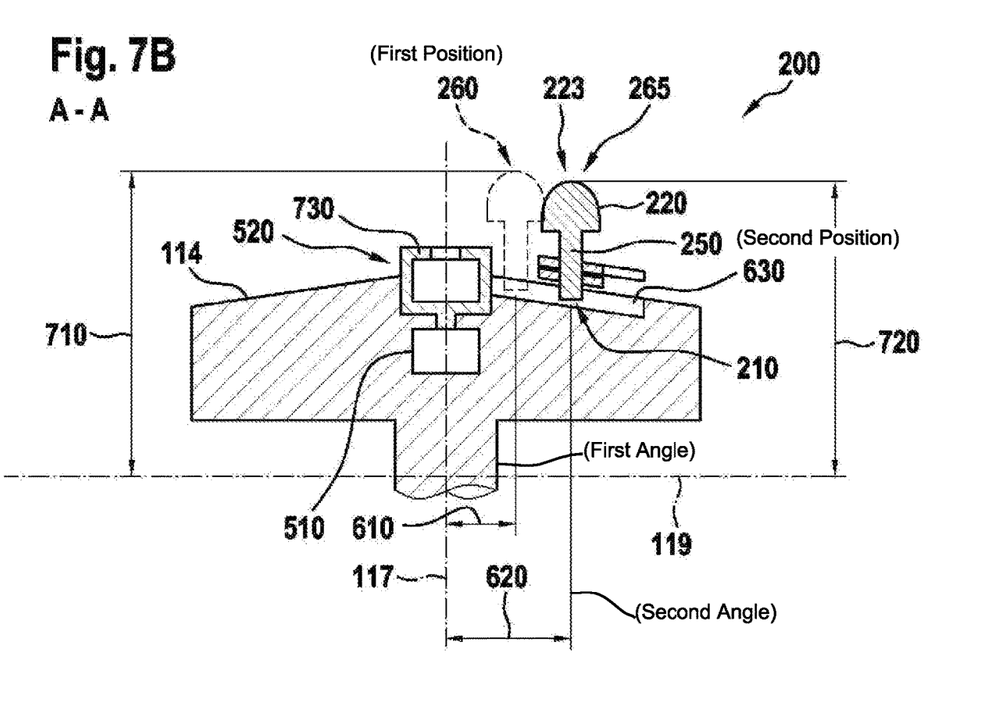
FIG. 7B is a cross-sectional view of the illustrative cyclic pitch angle adjustment apparatus of FIG. 7A in accordance with some embodiments.

FIG. 7A is a diagram of an illustrative cyclic pitch angle adjustment apparatus 200 with a motor 510 and an adjustment device 520 that includes a guiding groove 630 and a control lever 730, and FIG. 7B is a cross-sectional view of the illustrative cyclic pitch angle adjustment apparatus 200 of FIG. 7A.

Illustratively, the motor 510 may be located on the rotor axis 117. For example, the motor 510 may be embedded in the rotor head 114 as shown in FIG. 7B. If desired, the motor 510 may rotate around the rotor axis 117 in a first direction of rotation 740 or in a second direction of rotation 745.

The control lever 730 of the adjustment device 520 may be connected to the motor 510 such that the motor 510 moves the control lever 730. For example, the control lever 730 may rotate around the rotor axis 117 in response to a rotation of the motor 510 around the rotor axis 117.

The guiding groove 630 of the adjustment device 520 may encompass the central rod 250 and guide any movement of the central rod 250. As shown in FIG. 7B, the guiding groove 630 may have a gradient that is furthest away from the rotor plane 119 at the rotor axis and that approaches the rotor plane 119 with an increased distance from the rotor axis 117. The gradient may be constant.

If desired, the gradient may be non-constant. Thus, the gradient may change with the distance from the rotor axis 117. As an example, the gradient may increase with an increased distance from the rotor axis 117. As another example, the gradient may decrease with the distance from the rotor axis 117. As yet another example, the gradient may increase or decrease first and then decrease or increase with an increased distance from the rotor axis 117.

The control lever 730 may be bow-shaped and encompass the central rod 250. For example, the control lever 730 may have a fork or a loop at the end that is opposite the motor 510 with which the control lever 730 may move the central rod 250 in the guiding groove 630. Illustratively, the motor 510 and the control lever 730 may move the central rod 250 in the guiding groove 630 from the first position 260 to the second position 265.

As an example, consider the scenario in which the motor 510 rotates counterclockwise when seen from above (i.e., in direction of rotation 740 as shown in FIG. 7A). In this scenario, the bow-shaped control lever 730 may move in direction of rotation 740, thereby moving the central rod 250 from the first position 260 to the second position 265.

With the move of the central rod 250 from the first position 260 to the second position 265, the bearing 220 that is connected to the central rod 250 also changes positions. As shown in FIG. 7B, the bearing 220 has a first distance 610 from the rotor axis 117 in the first position 260 and a second, different distance 620 from the rotor axis 117 in the second position 265. Simultaneously, the bearing 220 has a first distance 710 from the rotor plane 119 in the first position 260 and a second, different distance 720 from the rotor plane 119 in the second position 265.

As another example, consider the scenario in which the motor 510 rotates clockwise when seen from above (i.e., in direction of rotation 745 as shown in FIG. 7A). In this scenario, the bow-shaped control lever 730 may move in direction of rotation 745, thereby moving the central rod 250 from the second position 265 to the first position 260.

With the move of the central rod 250 from the second position 265 to the first position 260, the bearing 220 that is connected to the central rod 250 also changes positions. As shown in FIG. 7B, the bearing 220 has a second distance 620 from the rotor axis 117 in the second position 265 and a first, different distance 610 from the rotor axis 117 in the first position 260. Simultaneously, the bearing 220 has a second distance 720 from the rotor plane 119 in the second position 265 and a first, different distance 710 from the rotor plane 119 in the first position 260.

Thus, as shown in FIGS. 7A and 7B, the motor 510 and the adjustment apparatus 520 are adapted for adjusting both, the distance from the rotor axis 117 and the distance from the rotor plane 119, at the same time.

Figure 8A:
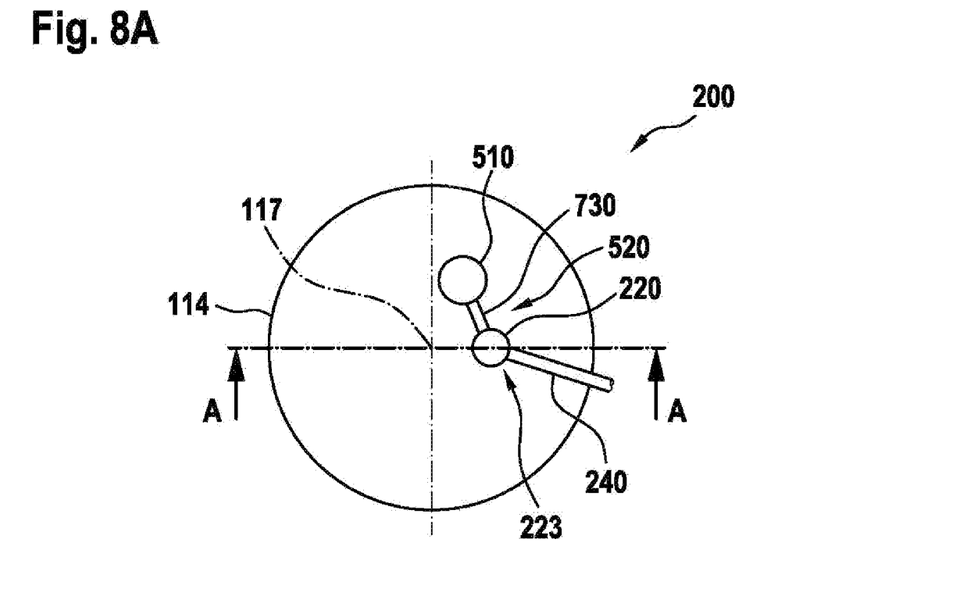
FIG. 8A is a diagram of an illustrative cyclic pitch angle adjustment apparatus with an adjustment device that adjusts a distance from the rotor plane and a distance from the rotor axis in accordance with some embodiments.
Figure 8B:
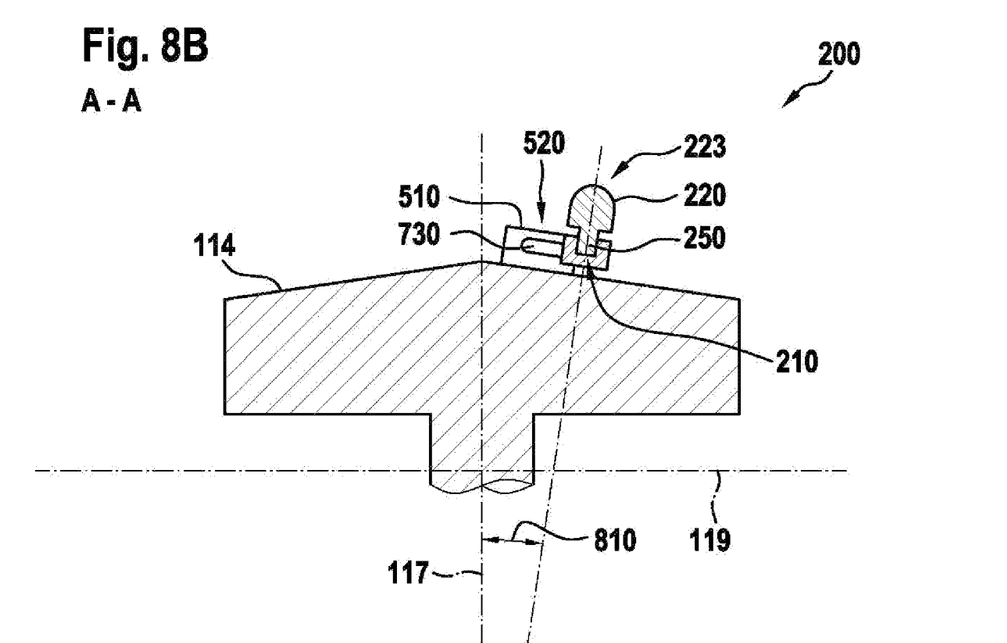
FIG. 8B is a cross-sectional view of the illustrative cyclic pitch angle adjustment apparatus of FIG. 8A in accordance with some embodiments.

FIG. 8A is a diagram of an illustrative cyclic pitch angle adjustment apparatus 200 with an adjustment device 520 that adjusts a distance from the rotor plane 119 and a distance from the rotor axis 117, and FIG. 8B is a cross-sectional view of the illustrative cyclic pitch angle adjustment apparatus of FIG. 8A.

As shown in FIG. 8B, the top of the rotor head 114 may be inclined relative to the rotor plane 119. In particular, the distance between the top of the rotor head 114 and the rotor plane 119 may be greatest at the rotor axis 117 and decrease with an increased distance from the rotor axis 117.

Illustratively, a motor 510 may be mounted on the top of the rotor head 114. The motor 510 may be located away from the rotor axis 117 on the inclination of the top of the rotor head 114 as shown in FIGS. 8A and 8B.

By way of example, the control lever 730 of the adjustment device 520 may be connected to the motor 510 such that the motor 510 moves the control lever 730. If desired, a guiding groove may encompass the central rod 250 and guide any movement of the central rod 250.

The control lever 730 may encompass the central rod 250. For example, the control lever 730 may have a fork or a loop at the end that is opposite the motor 510 with which the control lever 730 may move the central rod 250 in the guiding groove.

Illustratively, the motor 510 and the control lever 730 may move the central rod 250 in the guiding groove over the top of the rotor head 114 between different positions.

For example, the central rod 250 may be movable from a first position in which the central rod 250 forms a fixed angle 810 with the rotor axis 117 to a second position in which the central rod 250 forms the same fixed angle 810 with the rotor axis 117, wherein the first and second positions differ.

The fixed angle 810 between the central rod 250 and the rotor axis 117 may be any angle. For example, the fixed angle 810 may be 0°. In other words, the central rod 250 may be parallel to the rotor axis 117 (e.g., as shown in FIGS. 2B, 3B, and 5). As shown in FIG. 8B, the fixed angle 810 may be different than 0°.

With the move of the central rod 250 between different positions, the bearing 220 that is connected to the central rod 250 also changes positions. For example, the bearing 220 may change a distance from the rotor axis 117 and a distance from the rotor plane 119 simultaneously.

During a change in distance from the rotor axis 117 and/or from the rotor plane 119, the bearing 220 may adjust the pitch angle of the rotor blades that are attached via rods and levers to the bearing 220 (e.g., as described with reference to FIGS. 2A and 2B).

Figure 9A:
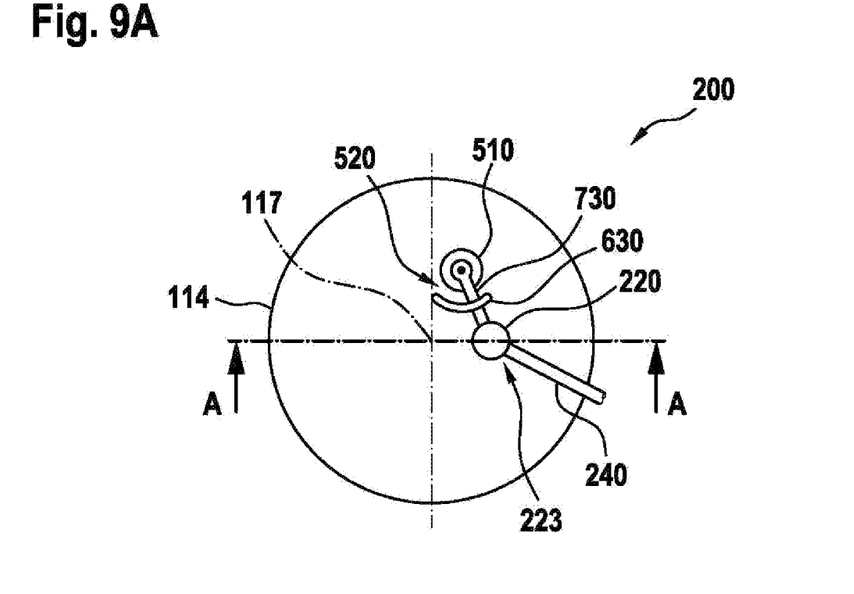
FIG. 9A is a diagram of an illustrative cyclic pitch angle adjustment apparatus with an adjustment device that includes a control lever that guides a central rod in a guiding groove in accordance with some embodiments.
Figure 9B:
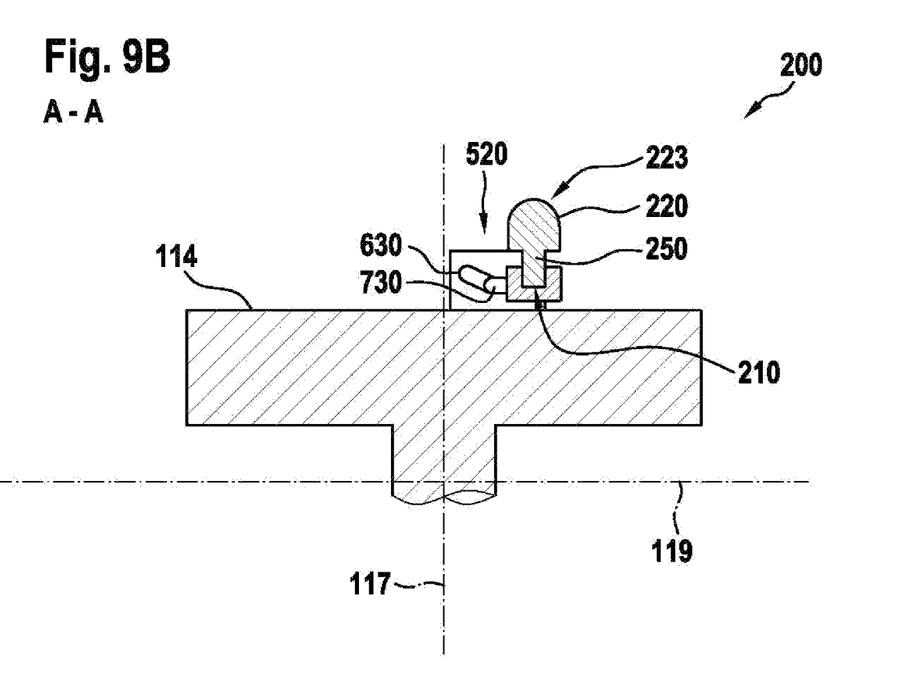
FIG. 9B is a cross-sectional view of the illustrative cyclic pitch angle adjustment apparatus of FIG. 9A in accordance with some embodiments.

FIG. 9A is a diagram of an illustrative cyclic pitch angle adjustment apparatus 200 with an adjustment device 520 that includes a control lever 730 that guides a central rod 250 in a guiding groove 630, and FIG. 9B is a cross-sectional view of the illustrative cyclic pitch angle adjustment apparatus 200 of FIG. 9A.

As shown in FIG. 9B, the top of the rotor head 114 may be parallel to the rotor plane 119, and a motor 510 may be mounted on the top of the rotor head 114. Illustratively, the motor 510 may be located on the top of the rotor head 114 at a predetermined distance from the rotor axis 117 as shown in FIGS. 9A and 9B.

By way of example, the control lever 730 of the adjustment device 520 may be connected to the motor 510 such that the motor 510 moves the control lever 730. Illustratively, the guiding groove 630 may be adapted for adjusting a distance of the bearing 220 from the rotor axis 117 and a distance of the bearing 220 from the rotor plane 119 simultaneously. If desired, the guiding groove 630 may have the shape of a spiral.

As an example, the guiding groove 630 may encompass the central rod 250 and guide any movement of the central rod 250. Thus, a move of the central rod 250 in the guiding groove 630 by means of the motor 510 and the control lever 730, and thus a move of the bearing 220, may change the distance of the bearing 220 from the rotor axis 117 and the distance of the bearing 220 from the rotor plane 119.

As another example, the control lever 730 may be attached to the central rod 250 and guided in a spiral-shaped guiding groove 630. Thus, a move of the central rod 250 by means of the motor 510 and a move of the control lever 730 in the guiding groove 630 may adjust the distance of the bearing 220 from the rotor axis 117 and the distance of the bearing 220 from the rotor plane 119.

During a change in distance from the rotor axis 117 and/or from the rotor plane 119, the bearing 220 may adjust the pitch angle of the rotor blades that are attached via rods and levers to the bearing 220.

Figure 10A:
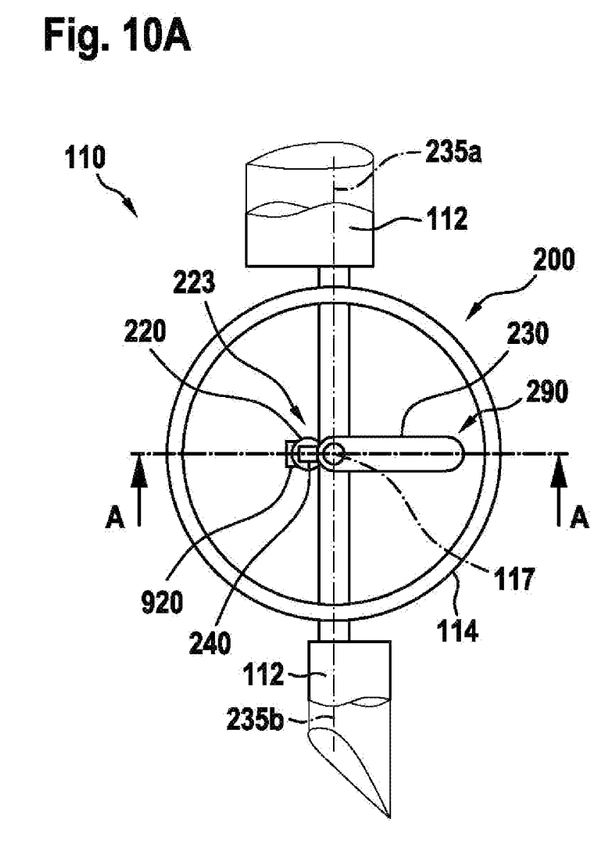
FIG. 10A is a diagram of an illustrative rotor with an illustrative cyclic pitch angle adjustment apparatus inside a rotor head in accordance with some embodiments.
Figure 10B:
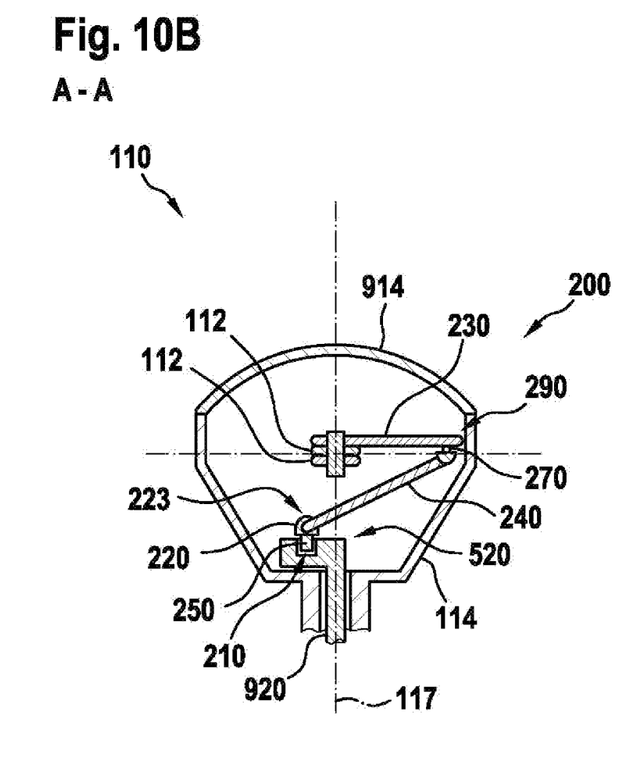
FIG. 10B is a cross-sectional view of the illustrative rotor of FIG. 10A in accordance with some embodiments.

FIG. 10A is a diagram of an illustrative rotor 110 with an illustrative cyclic pitch angle adjustment apparatus 200 inside a rotor head 114, and FIG. 10B is a cross-sectional view of the illustrative rotor of FIG. 10A.

For purposes of simplicity and clarity, the rotor head cover 914 has been removed in FIG. 10A. In particular, the central rod 250 of the cyclic pitch angle adjustment apparatus 200 may be located inside the rotor head 114.

Placing the cyclic pitch angle adjustment apparatus 200 inside the rotor head 114 may improve the aerodynamics of the rotor 110 and shield the cyclic pitch angle adjustment apparatus 200 from weather and soiling, which may increase the robustness, reduce deterioration, and decrease maintenance costs.

Illustratively, the cyclic pitch angle adjustment apparatus 200 may include a base point 210 and a bearing 220 that is located in a central point 223 outside the rotor plane 119. As an example, the rotor plane 119 may be located between the central point 223 and the rotor head cover 914.

As shown in FIGS. 10A and 10B, first and second levers may be integrally formed as a single lever 230. The single lever 230 may be connected to the rotor blades 112. The single lever 230 may rotate a first rotor blade 112 around a first pitch axis 235a and a second rotor blade 112 around a second pitch axis 235b.

Illustratively, first and second rods may be integrally formed as a single rod 240. A connection 270 may connect the single lever 230 and the single rod 240 with each other in a first location 290. The single rod 240 may mechanically link the single lever 230 with the bearing 220 in the central point 223 such that the single rod 240 is movable relative to the central point 223.

By way of example, the cyclic pitch adjustment apparatus 200 may include a central rod 250 that connects the bearing 220 with the base point 210. The central rod 250 may be movable from a first position in which the central rod 250 forms a fixed angle with the rotor axis 117 to a second position 265 in which the central rod 250 forms the same fixed angle with the rotor axis 117. For example, the central rod 250 may be movably mounted at rod 920.

Thereby, the central rod 250 may be adapted for adjusting the cyclic pitch angle of the first and second rotor blades 112 in the first position to a first pitch angle and in the second position to a second pitch angle that is different than the first pitch angle.

If desired, the cyclic pitch angle adjustment apparatus 200 may include a balance weight. The balance weight may be arranged in a second location. The first location 290 and the second location may be on opposite sides of the rotor axis 117. As an example, the single lever 230 may be extended on the side of the rotor axis 117 that is opposite the first location 290.

It should be noted that the above described embodiments are merely described to illustrate possible embodiments of the present disclosure, but not in order to restrict the present disclosure thereto. Instead, multiple modifications and variations of the above described embodiments are possible.

For instance, the first and second levers 230a, 230b of FIGS. 2A to 3B that are connected to the first and second rotor blades and rotate the first and second rotor blades 112 around the first and second pitch axes 235a, 235b, respectively are shown as separate levers. However, the first and second levers 230a, 230b may be integrally formed as a single lever, if desired.

Furthermore, the motors 510 and the adjustment devices 520 shown in FIGS. 5 to 9B may be combined with and integrated into any rotor 110 of FIGS. 2A to 4 and 10A and 10B, if desired.

REFERENCE LIST 100 rotorcraft
110 multi-blade rotor
112, 112a, 112b rotor blade
113 rotor hub
114 rotor head
115 rotor shaft
117 rotor axis
119 rotor plane
120 fuselage
123 cabin
127 rear fuselage
130 tail boom
135 horizontal stabilizer
140 counter-torque device
145 tail rotor
150 fin
200 cyclic pitch angle adjustment apparatus
205 flight direction
207 direction of rotation
210 base point
212a advancing rotor blade
212b retreating rotor blade
220 bearing
223 central point
230, 230a, 230b, 230c, 230d lever
235a, 235b, 235c, 235d pitch axis
240, 240a, 240b, 240c, 240d rod
250 central rod
260, 265 position
270 connection
280 balance weight
290, 295 location
510 motor
520 adjustment device
530a, 530b leg
540 platform
550 axis
610, 620 distance
630 guiding groove
710, 720 distance
730 control lever
740, 745 direction of rotation
810 fixed angle
914 rotor head cover
920 rod

What is claimed is:

1. A cyclic pitch angle adjustment apparatus for a rotor with a rotor head and rotor blades that rotate around a rotor axis in a rotor plane, comprising:
a base point;
a bearing that is located in a central point positioned outside the rotor plane;
a first lever that is connected to a first rotor blade of the rotor blades and rotates the first rotor blade around a first pitch axis;
a second lever that is connected to a second rotor blade of the rotor blades and rotates the second rotor blade around a second pitch axis;
first and second rods that mechanically link the first and second levers with the bearing in the central point such that the first and second rods are movable relative to the central point, wherein the first and second rods are integrally formed as a single rod;
a connection that connects the first lever, the second lever, and the single rod with each other in a first location; and
a central rod being disposed along a central rod axis that is parallel with the rotor axis, the central rod connects the bearing with the base point and is movable from along the central rod axis from a first position to a different second position and the central rod being adapted for adjusting the cyclic pitch angle of the first rotor blade and second rotor bladea when the central rod is positioned in the first position to a first pitch angle and when the central rod is positioned in the second position to a second pitch angle that is different from the first pitch angle.

2. The cyclic pitch angle adjustment apparatus of claim 1, wherein a first move of the central rod with the bearing along the central rod axis causes a second move of the first and second rods that causes first and second rotational moves of the first and second levers and thereby first and second rotations of the first and second rotor blades around the first and second pitch axes, respectively.

3. The cyclic pitch angle adjustment apparatus of claim 1, further comprising:
a balance weight that is arranged in a second location, wherein the first and second locations are on opposite sides of the rotor axis.

4. The cyclic pitch angle adjustment apparatus of claim 1, wherein the bearing has a first distance from the rotor axis in the first position and a second distance from the rotor axis in the second position, wherein the first and second distances from the rotor axis differ.

5. The cyclic pitch angle adjustment apparatus of claim 1, wherein the bearing has a first distance from the rotor plane in the first position and a second distance from the rotor plane in the second position, wherein the first and second distances from the rotor plane differ.

6. The cyclic pitch angle adjustment apparatus of claim 1, further comprising:
a motor that is coupled to the central rod and adapted for moving the central rod from the first position to the second position.

7. The cyclic pitch angle adjustment apparatus of claim 6, further comprising:
an adjustment device that is coupled between the motor and the central rod and that is adapted for adjusting at least one of a distance of the bearing from the rotor axis or a distance of the bearing from the rotor plane.

8. The cyclic pitch angle adjustment apparatus of claim 7, wherein the adjustment device further comprises:
a guiding groove that encompasses the central rod and guides the central rod from the first position to the second position.

9. The cyclic pitch angle adjustment apparatus of claim 8, wherein the adjustment device further comprises:
a control lever that is connected to the motor, wherein the motor moves the control lever such that the control lever moves the central rod in the guiding groove from the first position to the second position.

10. A rotor comprising:
the cyclic pitch angle adjustment apparatus of claim 1, wherein the rotor comprises the rotor blades that rotate around the rotor axis in the rotor plane.

11. A rotorcraft comprising the rotor of claim 10.

12. The cyclic pitch angle adjustment apparatus of claim 1, wherein the bearing has a first distance from the rotor plane in the first position and a second distance from the rotor plane in the second position, wherein the first and second distances from the rotor plane differ.

13. The cyclic pitch angle adjustment apparatus of claim 1, wherein the central rod is movable from the first position to the second position, and at least one of a distance of the bearing from the rotor axis or a distance of the bearing from the rotor plane is adjustable.

14. A cyclic pitch angle adjustment apparatus for a rotor with a rotor head and rotor blades that rotate around a rotor axis in a rotor plane, the cyclic pitch angle adjustment apparatus comprising:
- a base point;
- a bearing located in a central point positioned outside the rotor plane;
- a first lever connected to a first rotor blade of the rotor blades to rotate the first rotor blade around a first pitch axis;
- a second lever connected to a second rotor blade of the rotor blades to rotate the second rotor blade around a second pitch axis;
- first and second rods mechanically linking the first and second levers with the bearing in the central point such that the first and second rods are movable relative to the central point, the first and second rods integrally formed as a single rod;
- a connection connecting the first lever, the second lever, and the single rod with each other in a first location; and
- a central rod disposed along a central rod axis that is parallel with the rotor axis, the central rod connecting the bearing with the base point and movable from along the central rod axis from a first position to a different second position and the central rod adapted to adjust the cyclic pitch angle of the first rotor blade and second rotor blade when the central rod is positioned in the first position to a first pitch angle and when the central rod is positioned in the second position to a second pitch angle that is different from the first pitch angle.

15. The cyclic pitch angle adjustment apparatus of claim 14, wherein a first move of the central rod with the bearing along the central rod axis causes a second move of the first and second rods that causes first and second rotational moves of the first and second levers and thereby first and second rotations of the first and second rotor blades around the first and second pitch axes, respectively, wherein the cyclic pitch angle further comprising:
- a balance weight arranged in a second location, wherein the first and second locations are on opposite sides of the rotor axis.

16. The cyclic pitch angle adjustment apparatus of claim 14, wherein the bearing has a first distance from the rotor axis in the first position and a second distance from the rotor axis in the second position, wherein the first and second distances from the rotor axis differ.

17. A rotor comprising:
- the cyclic pitch angle adjustment apparatus of claim 13, wherein the rotor comprises the rotor blades that rotate around the rotor axis in the rotor plane.

18. A rotorcraft comprising the rotor of claim 17.

19. A cyclic pitch angle adjustment apparatus for a rotor with a rotor head and rotor blades that rotate around a rotor axis in a rotor plane, comprising:
- a base point;
- a bearing that is located in a central point positioned outside the rotor plane;
- a first lever that is connected to a first rotor blade of the rotor blades and rotates the first rotor blade around a first pitch axis;
- a second lever that is connected to a second rotor blade of the rotor blades and rotates the second rotor blade around a second pitch axis;
- first and second rods that mechanically link the first and second levers with the bearing in the central point such that the first and second rods are movable relative to the central point, wherein the first and second rods are integrally formed as a single rod;
- a connection that connects the first lever, the second lever, and the single rod with each other in a first location; and
- a central rod being disposed along a central rod axis that is parallel with the rotor axis, the central rod connects the bearing with the base point and is movable from along the central rod axis from a first position to a different second position and the central rod being adapted for adjusting the cyclic pitch angle of the first rotor blade and second rotor blade when the central rod is positioned in the first position to a first pitch angle and when the central rod is positioned in the second position to a second pitch angle that is different from the first pitch angle, at least one of a distance of the bearing from the rotor axis or a distance of the bearing from the rotor plane being adjustable.

* * * * *